United States Patent

Hirtreiter

[15] 3,690,152
[45] Sept. 12, 1972

[54] METHOD AND APPARATUS FOR BALANCING A BODY ABOUT AN AXIS

[72] Inventor: Walter J. Hirtreiter, 15 Ranch Trail, Williamsville, N.Y. 14221

[22] Filed: April 20, 1970

[21] Appl. No.: 29,844

[52] U.S. Cl. ................................................... 73/66
[51] Int. Cl. ............................................. G01m 1/00
[58] Field of Search .......... 73/66, 459, 460, 462, 468; 74/573

[56] References Cited

UNITED STATES PATENTS

| | | | |
|---|---|---|---|
| 2,937,613 | 5/1960 | Larsh | 73/66 |
| 1,209,730 | 12/1916 | Leblanc | 73/468 |
| 2,836,083 | 5/1958 | Smith | 74/573 |
| 3,299,714 | 1/1967 | Thompson et al. | 73/468 |

Primary Examiner—Richard C. Queisser
Assistant Examiner—Herbert Goldstein
Attorney—Christel & Bean

[57] ABSTRACT

A body to be balanced about an axis is provided with an annular groove capable of retaining a liquid having a viscosity which increases with time to a point at which flow ceases. The amount of unbalance in the body is sensed and the indication thereof is utilized to operate a positioning motor or similar device to move the body relative to the axis to distribute the liquid while the flow tends to cease. When the flow has stopped, the body is accurately balanced about the axis. The pendulous mass of an accelerometer can be balanced about an axis to make the mass insensitive to linear acceleration when it is desired to measure angular acceleration. A balancing ring provided with a liquid retaining annular groove is attached to the mass, and free rotation of the mass is restrained by operation of the accelerometer sensing means. Electrical signals indicative of movements of the mass about the axis activate a motor which, in turn, rotates the accelerometer casing to distribute balancing liquid along the groove in the ring. When the flow of liquid stops, the mass and ring are accurately balanced about the axis.

13 Claims, 6 Drawing Figures

*INVENTOR.*
WALTER J. HIRTREITER
BY
Christel & Bean
ATTORNEYS

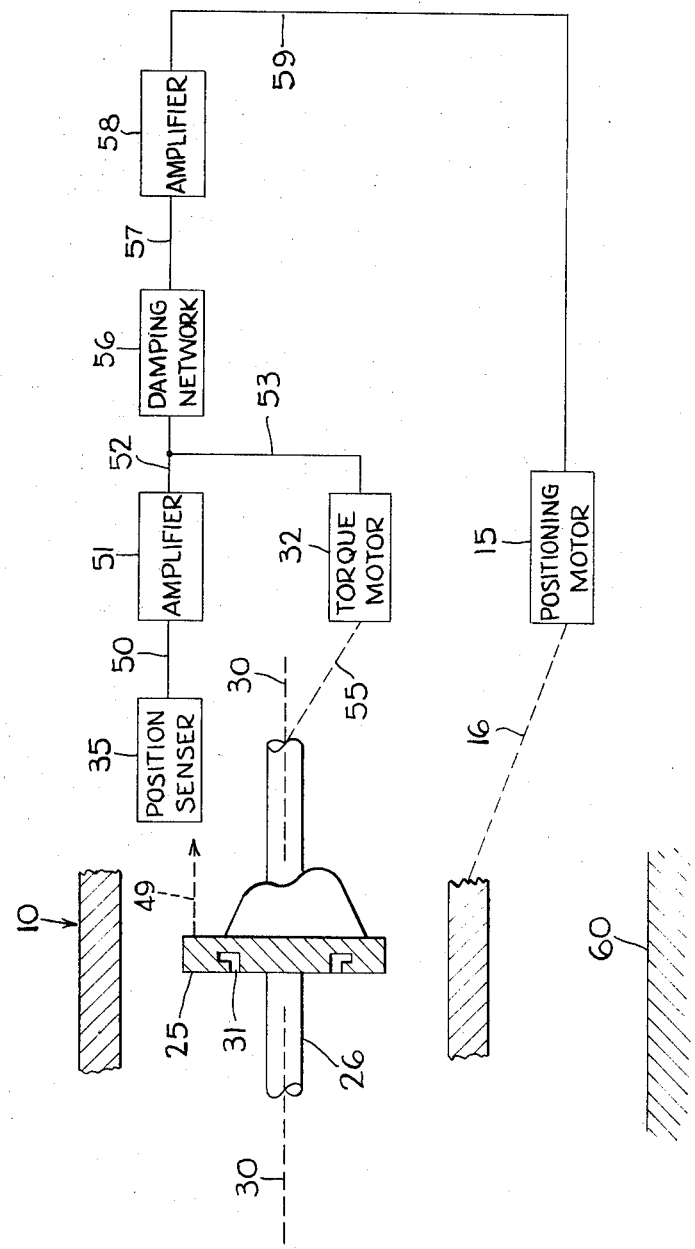

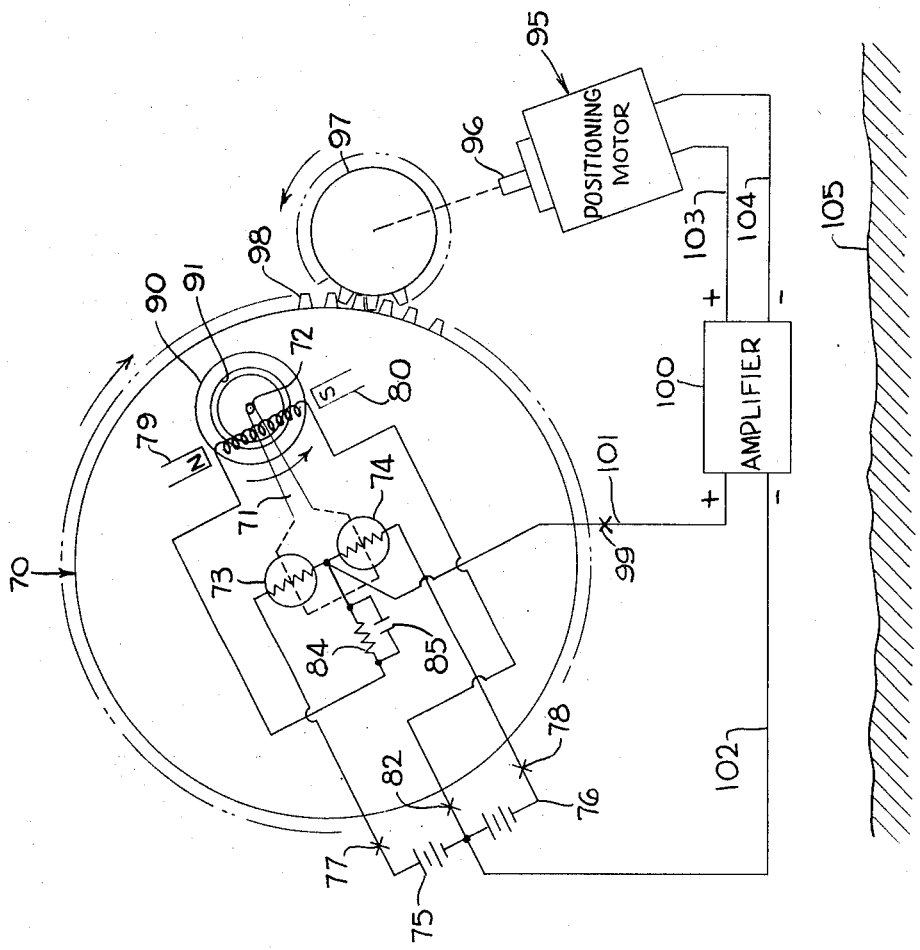
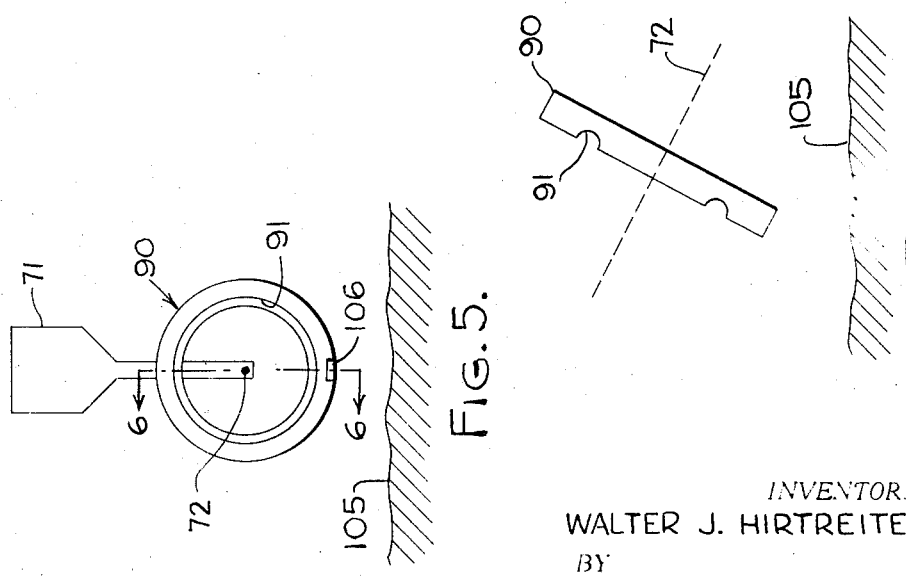

3,690,152

METHOD AND APPARATUS FOR BALANCING A BODY ABOUT AN AXIS

BACKGROUND OF THE INVENTION

The present invention relates to the static balancing art and, more particularly, to a method and apparatus for automatically balancing a body about an axis.

One area of use of the present invention is in balancing the inertial element or pendulous mass in an angular accelerometer although the principles of the invention can be variously applied. In static balancing of a body a nearly or approximately balanced condition is obtained by removing material from the heavy side of the body or by adding a suitable material to the lighter side. A small amount of unbalance remains which when the body is rotatably mounted tends to rotate the body under the influence of gravity so that the heaviest portion is nearest the earth.

An exactly balanced condition is extremely difficult if not impossible to attain by this method because of the need to determine the exact amount and location of the discrete material which must be added to or removed from the body. In addition, this procedure of adding or removing material from a discrete location can itself contribute to the existing unbalance when an exact balancing is attempted.

SUMMARY OF THE INVENTION

It would, therefore, be highly desirable to provide a method and apparatus for balancing a body about an axis in which a material is added to the body and then distributed in a controlled manner to achieve balance rather than being merely added or removed in a discrete amount from a particular location. In addition, by utilizing a measure of the remaining unbalance to control distribution of the material until the error in balance is reduced to zero, a high degree of accuracy which is characteristic of closed-loop control systems can be obtained.

The present invention provides a method and apparatus for balancing a body about an axis wherein the body is provided with an annular groove capable of retaining a liquid. The liquid introduced into the groove has a viscosity which increases with time to a point at which flow ceases. The amount of unbalance in the body is sensed and the indication thereof is utilized to operate a positioning motor or similar device to move the body relative to the axis to distribute the liquid while the flow tends to cease. When the flow has stopped, the body is accurately balanced about the axis.

While exemplary embodiments of the principles of the present invention are illustrated in the drawings and described in the following specification, it is to be understood that such embodiments are for the purpose of setting forth the operating principles of the present invention and the scope of the invention is not limited to such exemplary embodiments or otherwise than as defined in the appended claims.

BRIEF DESCRIPTION OF THE DRAWINGS

FIG. 3 is a block diagram of the apparatus of the present invention;

FIG. 4 is a wiring diagram of an accelerometer provided with the balancing system of the present invention;

FIG. 5 is a fragmentary elevational view of the inertial element and balancing ring of the accelerometer shown in FIG. 4; and FIG. 6 is a fragmentary cross sectional view taken about on line 6—6 in FIG. 5.

DESCRIPTION OF THE PREFERRED EMBODIMENTS

Figure 1:
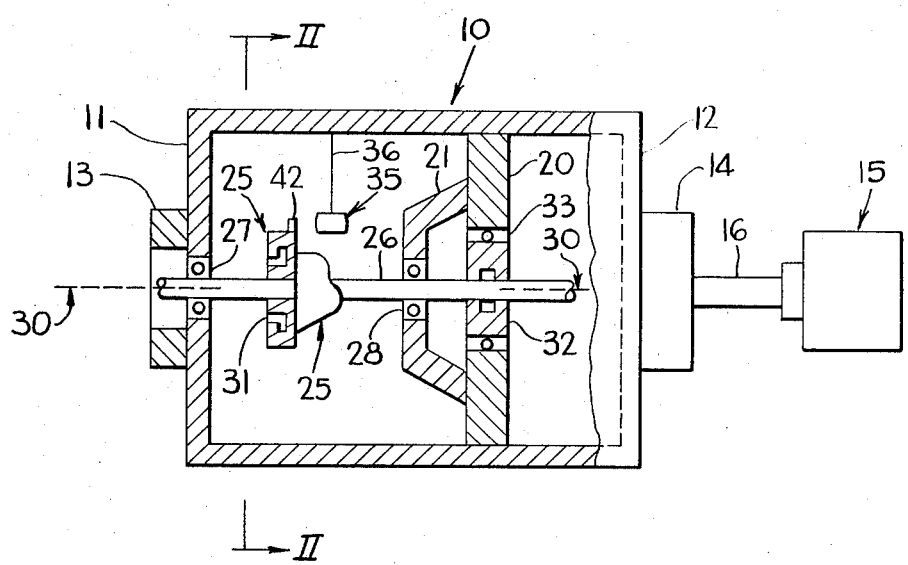
FIG. 1 is a longitudinal sectional view of one form of the apparatus of the present invention with some parts removed to illustrate the general support structure thereof.
Figure 2:
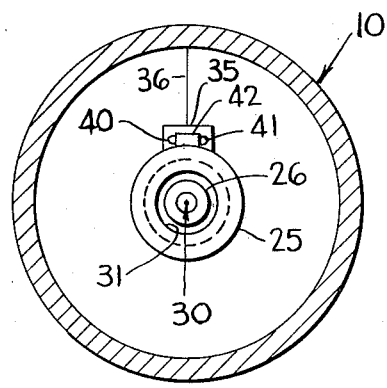
FIG. 2 is an elevational view taken about on line 2—2 of FIG. 1 and with parts removed.

FIGS. 1–3 illustrate apparatus according to the present invention for automatically balancing a body about an axis, in particular for automatically positioning the center of gravity of a body or mass so that this center coincides with the center of a specified or chosen support axis. The apparatus according to FIGS. 1–3 is applicable in general to various static balancing situations such as balancing of a wheel or a bearing on a supporting shaft. Another application of the apparatus of the present invention to the automatic balancing of the inertial element or pendulous mass in an angular accelerometer is illustrated in FIGS. 4–6 and is described in detail hereafter.

Referring now to FIG. 1, the apparatus according to this embodiment includes a casing 10 which is generally hollow cylindrical in shape and has axially spaced end walls 11 and 12. Casing 10 is mounted for rotation about its longitudinal axis by suitable means (not shown) which can be rotatably connected on hubs 13, 14 extending outwardly from the corresponding end walls 11 and 12, respectively. The apparatus further includes a positioning motor 15, which preferably is a reversable d.c. motor, for rotating casing 10 about the axis thereof. A shaft 16 connects the output shaft of motor 15 to casing 10 such as at hub 14 thereof. Casing 10 further includes an intermediate wall 20 generally parallel to and located between end walls 11 and 12. A hub 21 extends from wall 21 in an axial direction toward end wall 11.

A body to be balanced is shown generally at 25. Body 25 is a composite mass which in the most general case would have an irregular shape or configuration as indicated in the drawing. Body 25 is supported on a shaft 26 which, in turn, is rotatably supported in casing 10. In particular, one end of shaft 26 is journaled in a bearing 27 secured in a corresponding aperture in end wall 11, and the other end of shaft 26 is journaled in a bearing 28 which is secured in an aperture provided in hub 21. The support axis about which body 25 is to be balanced by the apparatus of the present invention is indicated by the dashed line 30 in FIG. 1, and the automatic balancing of body 25 will include the un-balance inherent in supporting shaft 26. Axis 30 coincides with the axis of shaft 26. In other words, the non-symmetrical distribution of mass in shaft 26 will be compensated for in the operation of the present apparatus. Bearings 27, 28 can be of various mechanical types such as ball, bushing, sleeve or needle, etc. In addition, bearings 27, 28 alternatively can comprises magnetic supports, air-supports or electrostatic bearing supports.

Body 25 is provided with an annular groove designated generally at 31 for retaining a balancing liquid as will be described in detail hereafter. Although body 25 by means of shaft 26 and bearings 27, 28 is rotatably mounted in casing 10, free rotation of body 25 relative to casing 10 is limited or restrained by means of a torque motor 32 drivingly connected to shaft 26 and supported in casing intermediate wall 20 by means of an annular bearing 33. When an appropriate electrical signal is applied to torque motor 32, it applies a restoring force or torque to shaft 26 and body 25 thereby limiting the amount of rotation of body 25 relative to casing 10. It should be noted that torque motor 32 alternatively can be positioned on shaft 26 between body 25 and bearing 28.

The apparatus of the present invention also includes sensing means 35, supported in casing 10 by suitable means such as that indicated generally at 36, for sensing angular position changes of body 25 about axis 30. The output of sensing means 35 is an electrical signal or quantity indicative of the amount of angular deviation of body 25 from a specified position relative to axis 30. As will be described in detail hereafter, the apparatus of the present invention includes a first closed-loop control system whereby the output signal of sensing means 35 operates torque motor 32 to keep body 25 in a specific position with respect to casing 10. The apparatus further comprises a second closed-loop control system whereby the output of sensing means 35 is utilized to operate positioning motor 15 to rotate casing 10 to distribute a balancing liquid along annular groove 31 of body 25 to provide an accurately balanced body.

Sensing means 35 preferably is of the type providing a balanced, i.e., null or reference, voltage output when body 25 is angularly positioned at a desired point with respect to axis 30 and, hence, with respect to casing 10. In the present instance, sensing means 35 is provided with a pair of photosensitive cells 40, 41, as shown in FIG. 2, disposed toward body 25, and body 25 is provided with an extension 42 axially opposite cells 40, 41. Extension 42 is of a size and is positioned on body 25 such that when body 25 is at the desired reference angular position, cells 40, 41 receive equal amounts of light from a source (not shown) positioned in approximate axial alignment with cells 40, 41 and between body 25 and casing end wall 11. Cells 40 and 41 can be of the photoelectric or photoconductive type which normally requires an exciting current and an amplifier or, alternately, cells 40, 41 can be of the self-generating, silicon voltaic type which can be used directly in a circuit with or without amplification. Any angular deviation of body 25 from the reference position causes unequal illumination of the cells 40, 41 thereby providing an unbalanced electrical condition manifested in an error signal voltage. While sensing means 35 preferably is of the photosensitive type, other sensors for example of the capacitive or inductive type can be employed without departing from the spirit and scope of the present invention. Reference may be made to Eyestone et al. U.S. Pat. No. 2,955,935 issued Aug. 15, 1961 for a more detailed description of such alternative sensing arrangements.

FIG. 3 is a block diagram showing the closed-loop control portions of the apparatus of the present invention. An input indicative of the angular position of body 25 about axis 30 is indicated by the dotted line 49 and is received by sensing means 35. According to the present illustration, input 49 is an equal or unequal amount of illumination on cells 40, 41 depending upon whether body is at or angularly displaced from, respectively, the desired reference position. An output signal provided by sensing means 35 is applied through a line 50 to the input of an amplifier 51, the output of which is available on a line 52. A line 53 connects line 52 to the input of torque motor 32 whereby the output of amplifier 51 energizes motor 32. Motor 32, in turn, is operatively connected to shaft 26 as indicated by the dashed line 55 in FIG. 3. The output of amplifier 51 also is applied through line 52 to the input of a damping network 56, the output of which is applied through a line 57 to the input of an amplifier 58. The output of amplifier 58, in turn, is applied through a line 59 to the input of positioning motor 15 for energizing the same. Positioning motor 15, it will be recalled, is operatively connected to casing 10 as indicated by dashed line 16. The earth or ground is indicated at 60 in FIG. 3 for convenience in illustrating the direction of the force of gravity acting on body 25.

The method of the present invention is performed in the following manner. Body 25 is provided with annular groove or channel 31 such as by machining the body or by suitably attaching to the body a separate part defining channel 31. Channel 31 is disposed in a plane intersecting axis 30 about which body 25 is to be balanced, and in addition, groove or channel 31 must have at least a minimum volume as will be explained presently. Body 25 also is closely or nearly balanced by anyone of various methods well known in the art. In particular, material can be removed from the heavy region or added to the lighter region of body 25 until a close balance is obtained. After groove or channel 31 is provided, body 25 is rotatably supported about axis 30 in the manner illustrated in FIG. 1 whereby shaft 26 is rotatably mounted in bearings 27, 28 which are fixed in casing 10.

A balancing liquid is introduced to groove or channel 31 which liquid has the characteristic of increasing viscosity with respect to time to a point at which the liquid flow ceases. In particular, the viscosity of the balancing liquid must be low enough at the time of introduction to groove 31 so that the liquid has a flowing characteristic. The viscosity also must be of a magnitude such that the flow of liquid to a new position in channel 31 is slower than the capability of positioning motor 15 to rotate casing 10. In addition, the amount of liquid introduced to groove or channel 31 must have more mass than that represented by any remaining mass-unbalance in body 25. In other words, groove or channel 31 must have a sufficient volumetric dimension to retain a quantity of balancing liquid having enough weight to overcome any unbalance remaining in body 25. The balancing liquid, could, for example, be a molten metal or an epoxy compound satisfying the above-mentioned viscosity requirements. In the latter instance, a two-part epoxy compound can be used which is commonly known to be fluid in nature while it is being mixed and remains so until the catalytic component thereof causes the resin to set-up, i.e., become solid or non-flowing.

As long as body 25 is not balanced about axis 30, the force of gravity will at some point about the axis of shaft 16 exert a force on body 25 rotating it toward a point of stable equilibrium. When body 25 reaches this point of equilibrium, the heaviest section of body 25 is nearest the earth or ground so that the moment arm of the force of gravity acting on the center of gravity of body 25 is zero. As the balancing liquid is introduced to groove 31 it will tend to flow toward the bottom thereof. Since the amount of liquid inserted in groove 31 has more mass than that represented by any remaining mass-unbalance in body 25, it will tend to rotate about axis 30. The next step in the method of the present invention, therefore, is detecting such rotation of body 25 about axis 30 and providing an indication in response thereto. Referring to FIG. 3, this rotation is sensed by means 35 which produces an electrical signal which, in turn, is applied to amplifier 51 when such amplification is necessary. In any event, the signal in original or amplified form is applied through line 53 to torque motor 32 which, in turn, applies a restoring torque or force to body 25 preventing free rotation thereof. The balancing liquid, however, does flow to the bottom of groove or channel 31 as would ordinarily occur even if body 25 were not constrained by torque motor 32. Position sensing means 35, amplifier 51 and torque motor 32 thus comprise a first closed-loop control system which maintains body 25 in a specific angular position with respect to axis 30 and, hence, casing 10.

The force tending to rotate body 25 and constrained by torque motor 32 is manifested in a voltage output from sensing means 35, amplified by amplifier 51, which voltage is proportional to this force arising from the unbalance. The error voltage indicative of the remaining unbalance is applied also through line 52 to the input of damping network 56 and is translated through amplifier 58 and line 59 to the input of positioning motor 15. Positioning motor 15 is operated in a manner such that casing 10 is rotated until the liquid unbalance in groove or channel 31 is positioned away from the earth 60 and from the point of equilibrium sought by the gravitational forces acting on body 25 due to the mass unbalance. If this new point were maintained, the output of sensing means 35 would become zero and positioning motor 15 would stop rotating casing 10. When the liquid is positioned at this point, however, it will tend to flow toward earth under the influence of gravity toward the bottom of groove or channel 13. This is because the viscosity is selected so that it flows to a new position in channel 31 slower than motor 15 rotates casing 10, i.e., motor 15 can rotate casing 10 faster than the liquid flows. As this happens the foregoing procedure is repeated automatically whereby the system continuously operates to position the heaviest portion of body 25 toward the "top" of casing 10, i.e., at a point where the heaviest portion of body 25 is angularly positioned away from the earth or ground 60 and where the moment or torque arising from force of gravity acting on body 25 is zero. The balancing liquid tends to thicken or become more viscous as a function of time with the result that after a period of time the flow of liquid stops. As the foregoing procedure continues, motor 15 likewise is slowed down but continues to operate until the liquid stops flowing.

The balancing liquid thus is distributed along groove 31 and body 25 is rotated by motor 15. When the flow of liquid ceases and this operation has ended, the liquid will have reached all portions of the annular groove 31 but a necessarily larger amount will have collected at a point therealong where it was necessary to create an accurate balance of body 25 about axis 30. Damping network 56 is constructed to have a time constant of sufficient magnitude to stabilize the closed-loop control system which operates positioning motor 15. Sensing means 35, amplifier 51 if needed, damping network 56, amplifier 58, and positioning motor 15 comprise a second closed-loop control system which functions to distribute the balancing liquid along groove 31 in body 25 in a manner providing an accurately balanced body. If the output of sensing means 35 is of a sufficient magnitude or level, amplifier 51 of course may not be needed. The operation of the second closed-loop system being on casing 10 in which body 25 is rotatably mounted, rather than directly on body 25, insures that the balancing operation itself does not create any additional unbalance in body 25.

FIGS. 4–6 illustrate the use of the method and apparatus of the present invention for automatically balancing the inertial element in an angular accelerometer. An accelerometer is shown in FIG. 4 comprising a casing or housing 70 and a mass 71 mounted in casing 70 for movement about an axis 72 in response to acceleration forces. The accelerometer further comprises sensing means preferably in the form of photosensitive cells 73 and 74 providing an electrical signal in response to movement of mass 71. In particular, cells 73 and 74 are connected in series across a d.c. power supply comprising batteries 75 and 76. Batteries 75 and 76 conveniently are located externally of casing 70, electrical connection being made through corresponding slip rings 77 and 78 to cells 73 and 74 within casing 70. The accelerometer also includes restoring means comprising a pair of opposed permanent magnet members, designated 79 and 80, and an interposed winding 81. One terminal of winding 81 is connected through a slip ring 82 to the junction of batteries 75 and 76, and the other terminal of winding 81 is connected through the parallel combination of a resistor 84 and a capacitor 85 to the junction of photosensitive cells 73 and 74. When mass 71 is in a medial position corresponding to zero acceleration, no current flows through winding 81. Any deflection of mass 71 in response to acceleration gives rise to a proportionate current flow through winding 81 causing the same to exert a force-balancing magnetic force in opposition to the acceleration force.

The operation of the accelerometer described thus far is similar to that shown in my pending application Ser. No. 605,903, filed Dec. 29, 1966 and entitled "Accelerometer." Photosensitive cell 73 and 74 are illuminated by a suitable arrangement of lamp and power supply (not shown) as in the afore-mentioned patent. Photosensitive cells 73 and 74 can be of the photoconductive type or, alternatively, of the self-generating silicon voltaic type as shown in the afore-mentioned application.

When the accelerometer is to measure angular acceleration, it is desired that mass 71 be balanced about axis 72 so as to be insensitive to any linear acceleration.

This is because any movement of mass 71 in response to linear acceleration would, of course, present an error in the measurement of angular acceleration.

According to this embodiment of the present invention there is provided a balancing element in the form of ring 90 having formed therein an annular groove 91. Ring 90 is attached to mass 71 in a suitable manner, as by welding, and is positioned thereon so as to surround axis 72 about which mass 71 is to be balanced. The position of ring 90 relative to mass 71 is shown more clearly in FIG. 5, and groove 91 is adapted to retain a balancing liquid as will be described presently. The apparatus further comprises a positioning motor 95, which preferably is of the d.c. reversible type but which also can be an a.c. servo motor, for rotating casing 70 to distribute the balancing liquid along annular groove 91. The output shaft 96 of motor 95 is coupled to casing 70 by means of a gear 97 fixed on shaft 96, the teeth of which gear mesh with or engage corresponding teeth 98 provided circumferentially around casing 70. The apparatus finally comprises means including an amplifier 100 for coupling the output of the accelerometer sensing means to the input of motor 95 for energizing the same. In particular, the junction of photosensitive cells 73, 74 is connected by means of a lead 101 and a slip ring 99 to one input of amplifier 100 and the other input of amplifier 100 is connected through a lead 102 to the junction of batteries 75, 76. The output terminals of amplifier 100 are connected through leads 103 and 104 to corresponding input terminals of motor 95. The earth or ground is indicated at 105 in FIGS. 4–6 to show its relative position to the accelerometer and mass 71 for convenience in illustrating the action of the force of gravity thereon.

The apparatus of FIGS. 4–6 operates in the following manner. Mass 71 is pendulous, and the force of gravity acting thereon tends to rotate mass 71 counterclockwise about axis 72 as indicated by the arrow in FIG. 4. In other words, the force of gravity tends to rotate mass 71 about axis 72 to a position where the heaviest portion relative to the axis 72 is nearest the earth 105. As a result, cells 73 and 74 are illuminated by unequal amounts thereby providing an electrical output, a portion of which is applied to winding 81 which exerts a restoring force on mass 71. In other words, free rotation of mass 71 about axis 72 is restrained by the force resulting from the flow of current through winding 81 which is positioned between magnets 79 and 80. This restoring operation is detailed in the afore-mentioned U.S. patent application. The same electrical output signal is applied through lines 101 and 102 to corresponding input terminals of amplifier 100. When the output voltage applied to amplifier 100 is of the polarity indicated in FIG. 4, motor 95 is rotated to rotate gear 97 and casing 70 in the direction indicated by the arrows in FIG. 4. This rotation of casing or housing 70, in turn, tends to position mass 71 so that the heaviest portion thereof is positioned at the "top" of casing 70 or, in other words, at a point where the heaviest portion of mass 71 is angularly positioned away from the earth and the moment or torque resulting from the force of gravity acting on mass 71 is zero. It should be noted that the only other angular position of the unbalanced mass 71 with respect to axis 72 where the moment or torque arising from the gravitational force on mass 71 is zero would be where the heaviest portion thereof is nearest the earth. This position is never reached, however, due to the afore-mentioned restoring force on mass 71 which restrains free rotation thereof about axis 72.

When mass 71 is so positioned at the "top" of casing 70 the resultant of gravitational forces becomes zero. This, in turn, would cause the accelerometer electrical output to become zero and thus stop the operation of positioning motor 95. Should positioning motor 95 overshoot the new position of equilibrium, the force of gravity will tend to rotate pendulous mass 71 in a clockwise direction. In response thereto, the output of the accelerometer will be of an opposite electrical polarity as compared to that illustrated in FIG. 4 thereby rotating motor 95 in the opposite direction to return mass 71 toward the new equilibrium position. Undesirable oscillatory movement about the new equilibrium position, otherwise known as hunting, can be prevented by including a conventional electrical damping network in amplifier 100.

According to the present invention, balancing ring 90 is suitably attached to mass 71 and is approximately or closely balanced by adding a counter weight such as that indicated at 106 in FIG. 5. Then a balancing liquid is added to groove 91 of ring 90, the liquid being in an amount and having a mass sufficient to compensate for any unbalance existing in the composite mass consisting of mass 71 and ring 90 about axis 72. In addition, casing 70 can be oriented to tilt ring 90 slightly as illustrated in FIG. 6 to insure that the liquid is retained in groove 91. The liquid, moreover, has a viscosity which increases with time to a point where flow ceases and can be an epoxy type compound as described in connection with the embodiment of FIGS. 1–3. As the liquid flows and gathers toward the bottom of groove 91, an electrical output signal will be developed causing motor 95 to rotate the composite mass tending to position the fluid unbalance at the "top" of casing 70, in other words at the above-described location away from the earth or ground 105. However, since the liquid will not remain at the top of groove 91, the accelerometer sensing means will detect the mass shift and produce an electrical signal which, in turn, causes motor 95 to rotate in the proper direction to keep that portion of the liquid causing any detectable unbalance at the "top" of casing 70 or at the above-described location away from the earth or ground 105.

The apparatus follows this procedure continuously, but the operation begins to slow down as the liquid thickens or the viscosity increases. The operation, including changes in the direction of rotation of motor 95, is semi-random in operation. As the viscosity of the liquid increases to the point at which flow ceases, the balancing action slows down in operation. When liquid flow stops, the balancing action ends and the liquid will have reached all portions of annular groove 91 in ring 90. A necessarily larger amount of liquid will have collected at a point along groove 91 where it is necessary to compensate for the unbalance of the composite mass about axis 72. With the composite mass accurately balanced about axis 72, the accelerometer is insensitive to linear acceleration and can accurately measure angular acceleration.

I claim:

1. A method for automatically balancing a body about an axis comprising the steps of:
   a. providing said body with an annular groove capable of retaining a liquid;
   b. rotatably supporting said body about said axis;
   c. introducing to said groove a liquid having the characteristic of increasing viscosity with time to a point at which flow ceases;
   d. detecting rotation of said body about said axis relative to a frame of reference and providing an indication in response thereto;
   e. applying a restoring force to said body in response to said indication to prevent free rotation of said body about said axis; and
   f. rotating said frame of reference about said axis in response to said indication counter to the gravitational force causing unbalance so as to distribute said liquid in said groove in such a manner as to balance said body about said axis.

2. A method according to claim 1 wherein said groove is located in a plane intersecting said axis.

3. A method according to claim 1 wherein said liquid is introduced in an amount constituting more mass than that represented by any remaining mass-unbalance in said body.

4. A method according to claim 1 wherein said groove has a volumetric dimension sufficient to hold a quantity of liquid having enough weight to overcome any unbalance in said body about said axis.

5. A method according to claim 1 wherein said body is rotated at a speed greater than the rate of flow of said liquid.

6. Apparatus for balancing about a balancing axis a body having an annular groove for retaining a liquid, the viscosity of which increases with time to a point at which flow ceases, said apparatus comprising:
   a. a casing supported for rotation about an axis;
   b. means for rotatably supporting said body in said casing about said balancing axis;
   c. a torque motor coupled to said body and operative to limit the amount of rotation of said body relative to said casing;
   d. sensing means for producing an electrical signal indicative of changes in the angular position of said body about said balancing axis;
   e. means for coupling the electrical signal produced by said sensing means to said torque motor;
   f. a positioning motor coupled to said casing for rotating said casing; and
   g. means for coupling the output of said sensing means to said positioning motor whereby said casing is rotated to rotate said body to a position where the heaviest portion of said body is angularly positioned away from the earth and where the torque or moment resulting from the force of gravity acting on said body is zero.

7. Apparatus according to claim 6 wherein the axis of rotation of said casing coincides with said balancing axis of said body.

8. Apparatus according to claim 6 wherein said means coupling the output of said sensing means to said torque motor comprises an amplifier.

9. Apparatus according to claim 6 wherein said means coupling the output of said sensing means to said positioning motor comprises an amplifier and a damping network.

10. In combination with an accelerometer having a casing, a mass mounted in said casing for movement about an axis in response to acceleration forces, sensing means providing an electrical signal in response to movement of said mass, and restoring means operatively connected to said sensing means for applying a restoring force to said mass, apparatus for balancing said mass about said axis comprising:
    a. a balancing element attached to said mass and having formed therein an annular groove, said groove being adapted to retain a liquid, the viscosity of which increases with time to a point at which flow ceases;
    b. a motor coupled to said casing for rotating said casing about an axis; and
    c. means for coupling the electrical output signal of said sensing means to said motor; whereby
    d. when said liquid is in said groove said motor rotates said casing to maintain the position of the portion of liquid causing any detectable unbalance at a point where the heaviest portion of said body is angularly positioned away from the earth and where the torque or moment resulting from the force of gravity acting on said mass is zero.

11. The combination according to claim 10 wherein said balancing element comprises an annular ring and is located in a plane intersecting said axis.

12. The combination according to claim 10 wherein said groove has a volumetric dimension sufficient to hold a quantity of liquid having enough weight to overcome any unbalance in said mass about said axis.

13. The combination according to claim 10 wherein said means for coupling the output of said sensing means to said motor comprises an amplifier.

* * * * *